March 28, 1967

H. RUMPF ETAL 3,311,234

PROCESS AND APPARATUS FOR PNEUMATICALLY
SEPARATING SOLID PARTICLES

Filed Dec. 17, 1964

Inventors:
Hans Rumpf
Kurt Leschonski

BY Nolte & Nolte
Attorneys

United States Patent Office 3,311,234
Patented Mar. 28, 1967

3,311,234
PROCESS AND APPARATUS FOR PNEUMATI-
CALLY SEPARATING SOLID PARTICLES
Hans Rumpf, 12 Hansjakobstr., Karlsruhe, Germany, and
Kurt Leschonski, Forchheim, Germany; said Leschon-
ski assignor to said Rumpf
Filed Dec. 17, 1964, Ser. No. 419,013
Claims priority, application Germany, Dec. 20, 1963,
R 36,854
22 Claims. (Cl. 209—137)

The present invention relates to a process and a device for sifting granular material with the aid of a stream of gas, e.g. air flowing transversely to the direction in which a stream of material to be sifted is initially projected. More particularly, the invention relates to a process and a device for this type of sifting wherein the cut sizes (separation points) are less than one millimeter and wherein gravity is not employed to a determining degree.

Sifting devices in which the granular material is introduced into a stream of gas transversely thereto have been known for a long time. Such "transverse-flow" sifting devices are, for example, used in a primitive form for cleaning processes in which a coarse material is to be separated from a constituent having a very low terminal velocity. Difficult technical problems arise when a dispersed material having a broad particle-size distribution is to be sharply divided into two or more fractions.

For this purpose, there are generally employed gravity classifier, or such devices in conjunction with a transverse-flow sifter. Fine sifting with cut sizes below 30 microns is preferably effected by centrifugal classification. For coarse separations, viz. a few tenths of a millimeter or more, gravity sifter are used. For intermediate particle sizes, combined gravity and centrifugal classifiers are preferred, but experience shows that the sharpness of separation of these combined classifiers is poor.

In all gravity classifiers the balanced fraction, which theoretically remains in suspension, attains an infinitely high concentration in the sifting zone. This applies also to fractions of which the particle size differs only slightly from that of the cut size. It is impossible for these fractions to attain infinitely high concentration in the sifting zone, and consequently they are distributed statistically to the fine and coarse-material side. This necessarily results in lack of sharpness of separation, which is markedly increased if the material feed rate is too large. The enriching effect thereby limits the rate at which a gravity classifier can handle material.

Transverse-flow sifters, in which the material is accelerated pneumatically transversely into the stream of gas, have the disadvantage that the pneumatic acceleration causes the fine particles to attain higher velocities than the coarse particles. This impairs the desired separating effect. In the gravitational acceleration within the transverse flow, the entry velocity of the large particles is higher than that of the small ones. This favors the separation. The velocities of the fall—a maximum of 4.5 m./s. (meters per second) for a distance of fall of 1 m. (meter)—are not, however, adequate for separations in the medium and fine ranges. Moreover, during movement of the particles in a duct, impacts on the walls thereof cause considerable variations of velocity, in size and direction.

There are also other classifiers in which the material is accelerated by a circulating air current, and is then conveyed into a transverse current. These arrangements also have the disadvantage that due to wall effects and the non-uniform distribution of the velocity of the material and air in the accelerating duct, the initial separating conditions for the particles are too inexact and varying for sharp separation.

The principle of transverse-flow sifting is thus known, but its technical application has so far been achieved only to a very incomplete extent.

The object of the invention is to provide a process and a device for transverse-flow sifting of granular material with cut sizes below 1 mm., without using gravity.

A gas is employed as the flow medium. The invention, according to one of the major features, consists essentially in the use of means whereby all the particles of the same grain size describe exactly similar parallel paths, so that sharp separation of other material fractions describing different paths is possible.

The invention also resides in means that serve to separate the fractions sharply from one another and to prevent the particles from returning to the gaseous stream and into the wrong fraction after separation has been effected, as the result of secondary effects.

The first problem is solved by arranging that all the particles are positively accelerated in a movable projecting device, preferably comprising one or two conveyor belts or rollers, to the speed of travel of the projecting device, and are thrown at a velocity which is equal in magnitude and direction to the said speed of travel, in a thin layer into a flat gas stream flowing along planes which coincide with parallel planes in which the paths of the material are located. A gaseous stream that coincides in magnitude and direction is set up in the parallel planes of flow, preferably by means of flow directing devices and nozzles.

The process according to the invention differs from all sifting processes having an angularly symmetrical arrangement and from those having spacially curved gas streams. In order that fine sifting with cut sizes below 1 mm. may be attained, the velocity of projection of the material must be at least 5 m./s. and the flow velocity of the gas at least 20 m./s.

Thus, according to the process of the present invention granular material is classified according to size. The process of the invention involves the steps of continuously transporting all of the particles of the granular material in a thin layer, which is located at least in part in a given plane, at a predetermined forwarding velocity of at least 5 meters per second, so that the particles in the thin layer describe predetermined paths in the latter plane. The particles which are continuously transported in this way are then thrown from the thin layer along trajectory paths which form extensions of the above paths of the particles in the latter plane, and the trajectory paths together with the paths described by the particles in the plane of the thin layer are situated in planes which are perpendicular to the latter plane in which at least part of the thin layer is located. These trajectory paths along which the particles are thrown are intersected by a gaseous current which has an inner laminar core moving at a velocity of at least 20 meters per second and an outer zone of turbulence at a region of said core distant from said thin layer, and this gaseous current is directed transversely with respect to the thin layer along the above-mentioned planes which are perpendicular to the plane in which the thin layer is at least partly located, so as to eliminate a dominant influence of gravity while entraining the particles which are below a given size in the laminar core. Finally, particles of granular material which are greater than the latter given size are separated from the gaseous current, and the latter separated particles are prevented from rebounding or having a reverse flow back into the gaseous current.

Usually good sharpness of separation is obtained by exactly observing, as far as possible, the following conditions: congruent flows in parallel planes, entry velocities of all particles in exact agreement as regards magnitude and direction, supply of material in a thin layer, and avoidance of rebound and flowing back of coarse classified particles by making the collecting duct for coarse material of adequate width and satisfactory from the point of view of flow technique.

Poor sharpness of separation depends on the degree of the inexactness with which these conditions are observed. Even if the features of the invention are fulfilled only partially, nevertheless considerably sharper separation can be obtained than was previously possible.

Other objects and advantages of the invention will be appreciated and more fully understood with reference to the following detailed description, when considered with the accompanying drawings, wherein.

The transverse-flow sifter according to the invention will first be described, and then the sifting process according to the invention will be explained.

Figure 1:
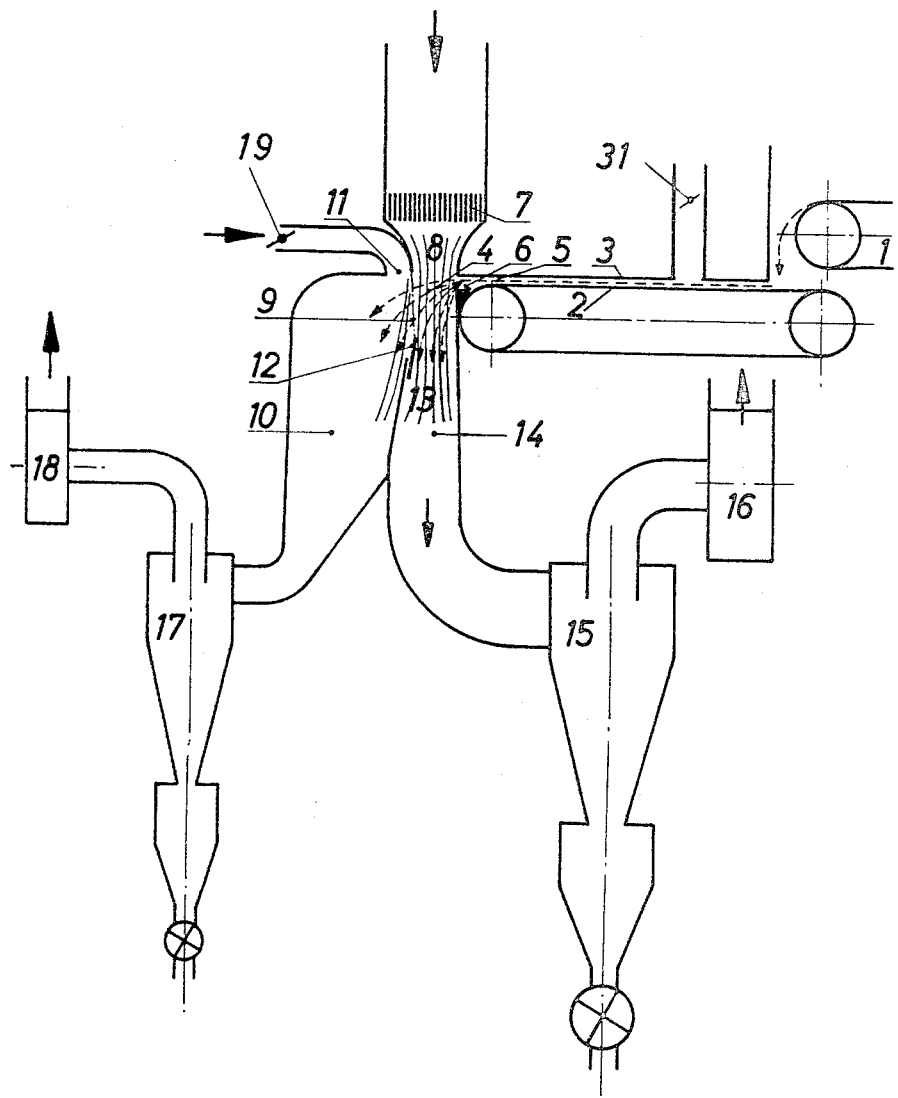
FIG. 1 is a somewhat schematic illustration of a preferred embodiment of a complete transverse-flow sifter according to the invention, showing the material to be sifted being fed into a sifting zone, followed by separators for coarse and fine-material recovery.

A preferred device for carrying the process into effect is illustrated in FIG. 1. The material to be classified is introduced from a feeder 1, for example a conveyor-belt scale, onto a projecting belt 2 in a uniform thin layer. The space above the layer of material is covered by a wall 3. The material is projected from the belt 2 at 5, and is flung at 6 into a sifting zone 4 which at this point is 10 to 15 centimeters or less wide. The uniform thin layer of granular material is situated at least in part in a given plane which in the example of FIG. 1 is horizontal and is perpendicular to the plane of FIG. 1. The particles in the thin layer thus describe predetermined horizontal paths in the horizontal plane of the thin layer of FIG. 1, and the particles which are transported in the thin layer are thrown along trajectory paths in the sifting zone 4, these trajectory paths forming extensions of the paths of the particles while they are in the thin layer. The trajectory paths together with the paths of the particles in the thin layer are situated in planes which are perpendicular to the plane in which at least part of the thin layer is located, and one of these perpendicular planes is in fact the plane of FIG. 1.

A stream of gas, the velocity of which is adjusted to the same value over its whole cross section by means of a flow straightener 7 and a nozzle 8, enters this sifting zone 4 from above. The gaseous current which is introduced in this way thus flows along the planes which include the trajectory paths of the particles and their paths in the thin layer, and as is apparent from FIG. 1 the gaseous current does indeed flow along the plane of FIG. 1. In the sifting zone the material spreads out like a mist, so to speak as a veil. The side of the gas stream opposite the material entry point 6 has a free boundary 9 through which the coarse material flows into a coarse-material withdrawal or removal duct 10.

Figure 2:
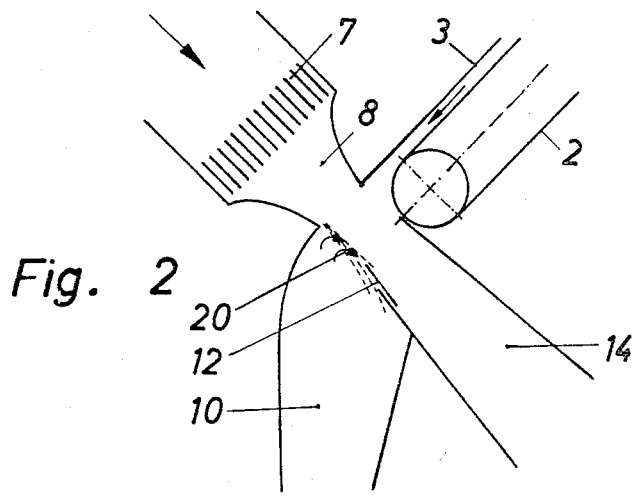
FIG. 2 shows a modification of the arrangement shown in FIG. 1, with regard to the position of the flow duct, the feeding of the material to be sifted and the removal of the coarse material from the flow duct.

A turbulent mixing zone 20, FIG. 2, forms in the free boundary. The air that is there mixed in is, in the case of FIG. 1, fed into the coarse-material removal duct 10 from the exterior through an opening 11, the supply being adjustable by means of a throttle member 19. The free stream is so divided by blade 12, adjustable in the direction of the stream lines of the sifting stream, that the turbulent mixing zone passes to the coarse-material side 10 and a core or main stream 13 passes to the fine-material side. For the purpose of pressure recovery a diffusor 14 can be provided on the fine-material side. Fine and coarse materials are separated from the gas stream in cyclones 15, 17, respectively, or other separating devices.

For the purpose of feeding material into the transverse current, in accordance with the invention there may be used a conveyor belt which is loaded with a shallow layer of material, preferably a few tenths of a millimeter thick, or a few millimeters thick in the case of high-power apparatus, the belt being driven at a speed above 5 m./s. Referring to FIG. 1, the layer of material flies off the belt 2 at 5 where the belt passes over an end roller, and is projected into the transverse current.

Figure 5:
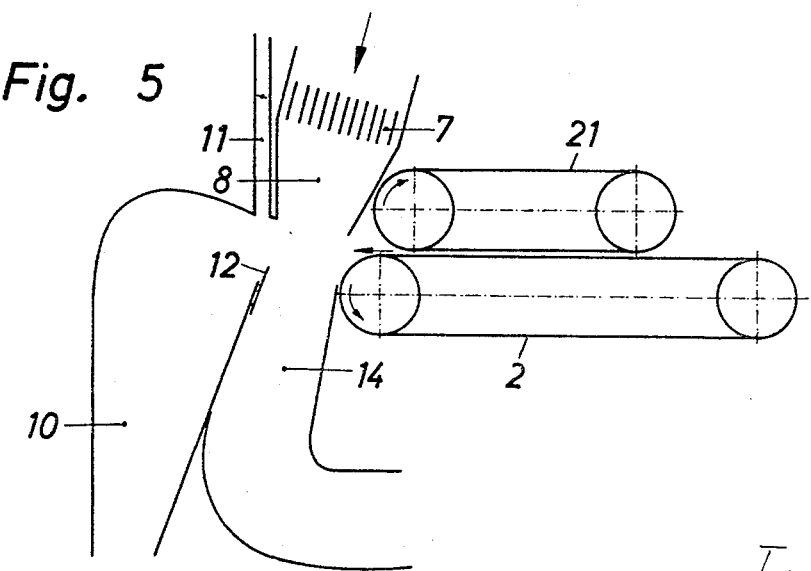
FIG. 5 illustrates schematically a transverse-flow sifter embodiment in which the feeding of material to be sifted is effected by means of two superimposed conveyor belts.
Figure 6:
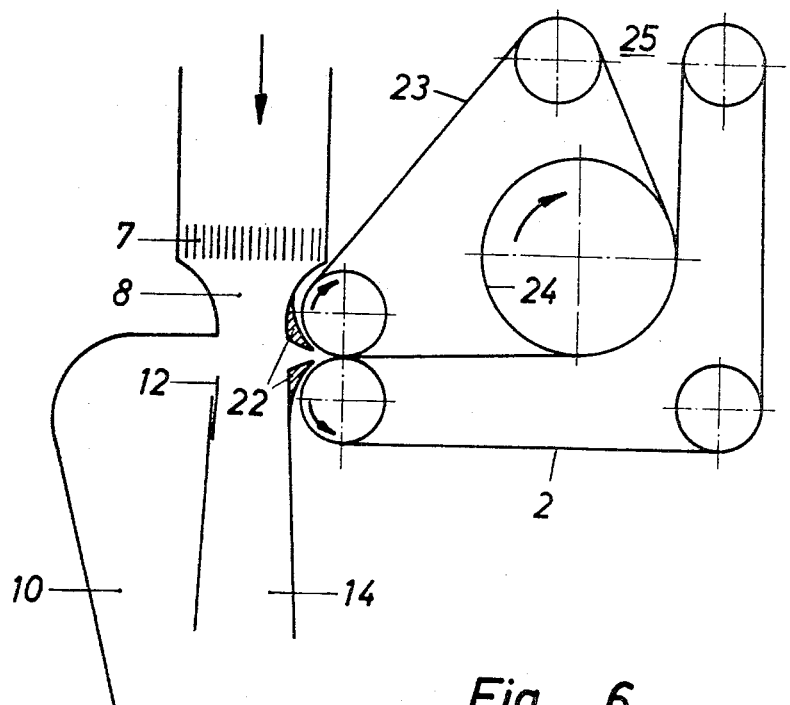
FIG. 6 shows a further construction of the feeding mechanism having two superimposed conveyor belts, in which the material to be sifted is fed to a wedge-shaped gap.

In order to accelerate the material to high speeds and to prevent premature break-up of the stream of material, as shown in FIGS. 5 and 6, the projecting belt 2 may have associated with it an upper belt 21 or 23, respectively, moving at the same speed, which covers the layer of material. It is particularly advantageous for the two belts to be superimposed and the material to be held firmly between the belts due to their resilience, or accommodated in a flat channel between the belts.

A particularly advantageous construction is illustrated in FIG. 6. The material is introduced in a continuous stream into a wedge-shaped gap 25, is engaged by the two belts 2 and 23, and after passing around a driving roller 24 is accelerated to the projection velocity. This has the advantage that the material can be accelerated to high velocities without slipping backwards relative to the belt and thereby accumulating and causing high wear of the belt. In FIG. 6, two filling pieces 22 are also provided, these covering the stream of material and being used, if desired, to strip the material from the belt.

A further feature of the invention is that between the projection point 5 and entry into the transverse current at 6 the particles must fly through a free flat path in which the velocity of entry into the transverse current can be additionally influenced. This is achieved by causing an additional quantity of gas to flow with the particles in the direction of the belt, the velocity of this gas being adjustable by means of a throttle member 31 (see FIG. 1). For this purpose, for example, the space above the projection belt is covered by the wall 3, and is bounded by side walls to form a duct. The material is fed into this duct together with an additional quantity of gas adjustable by means of the throttle member 31. When they have the same velocity as the belt, the particles retain their projection velocity. They are then carried by a stream which enters the gas current.

If the additional quantity of current moving with the particles is adjusted to a lower velocity, in the extreme case to zero velocity with the throttle 31 fully closed, the particles are retarded. Only the boundary layer of additional gas carried along by the belt 2 and by the particles at the boundary of the stream of material moves along in the direction of the belt.

It is advantageous to arrange for the flow velocity of the transverse current to be higher than the entry velocity of the particles of material at all points within the sifting zone 4. In this way, in the sifting zone 4, the absolute velocity and hence the distance between the particles increase along their path.

A further basic feature of the invention consists in the congruence of the gas current in the parallel flow planes; in the sifting zone, the same gas velocity exists, as regards direction and magnitude, in every plane parallel to the axis of the projection roller. The sifting zone is as wide as the projected layer of material. The course of the flow in one plane of flow may be arranged to be different. The stream lines may be straight or curved, the gas velocity may vary along the stream lines. The gas flow must, however, be "clean" and stationary in order to avoid with certainty reverse flow and eddy losses. Where necessary, this condition of gas flow congruence may also be fulfilled by causing the layer of material to enter the middle zone of a ducted flow with turbulent velocity profile.

In accordance with the invention the separation is improved considerably if by using wind-tunnel technique, i.e. by means of the flow straightener 7 and the nozzle 8, satisfactory parallel flow with the same speed in all streamlines is established at the nozzle opening, and the material is flung transversely into this current directly behind the nozzle. The gas current emerging from the nozzle may be free on all sides, as in a wind tunnel, and the layer of material does not then need to be wider than the core or main stream 13 at the downstream end of the sifting zone 4.

In accordance with the invention this is determined by the blade 12 (FIGS. 1–6) or a blade 28 (FIG. 7) that separates off the coarse material. The gas (sifting current) is preferably guided on both sides by walls so that no additional sifting gas, that is not used for sifting, is mixed in with it there. It is further advantageous for the sifting current to be guided also at the side at which the material enters, downstream from the place at which the material enters.

A further important feature of the invention is that the sifting current is arranged to be a free flow on the opposite side i.e. at the side at which the coarse material emerges, as far as the blade 12 or 28. This is achieved by suitable adjustment of the pressure in the nozzle opening, in the coarse-material removal duct 10 and on the fine-material side. The duct 10 for the coarse material can then be made as wide as desired so that the withdrawn material cannot rebound back into the sifting current. This can also be ensured, in accordance with the invention, by means of flexible walls, e.g. rubber curtains, and by inclining the walls relative to the paths of the coarse material.

The free flow is limited by the turbulent mixing zone 20, FIG. 2, in which secondary gas is drawn into the stream. In accordance with the invention this secondary gas is fed from the exterior to the coarse-material guide duct where it is guided in such manner that no coarse material is carried back into the sifting space 4. This is achieved, for example, by introducing this secondary gas into the coarse-material removal duct above the coarse-material paths or openings 11, FIGS. 1 and 5. This secondary gas can also be used for further sifting in the coarse-material removal duct.

The basic principle of the invention can also be fulfilled if no free gas-flow boundary is provided on the coarse-material side, the sifting current also being guided there and divided by a blade. In this case, however, there is great risk of the coarse material rebounding, due to the current of coarse material flowing into a relatively wide duct and hence carrying an unnecessarily large quantity of gas with it.

In contrast, the free flow arrangement provides a solution in which the whole of the quantity of gas is removed on the fine-material side and the coarse material is thrown out without any secondary gas being drawn along with it. It is, however, particularly advantageous to arrange the blades 12 and 28 so as to divide the turbulent mixing zone 20, FIG. 2, and only allow the undisturbed core or main stream 13 to flow away to the fine-material side. If, however, a predetermined large quantity of gas is required for conveying the coarse material, the blade 12 or 28 may be adjusted correspondingly deeply into the core current.

In order to adjust the cut size (separation point), the conveying velocity of the conveyor belt and the flow velocity of the sifting gas may be varied. The belt velocity is in the range between 5 and say 100 m./sec., the gas velocity is between 20 and above 100 m./sec. The cut size can also be modified by shifting the blade 12 or 28 in the direction of or transversely to the gas stream lines, FIG. 7.

Figure 7:
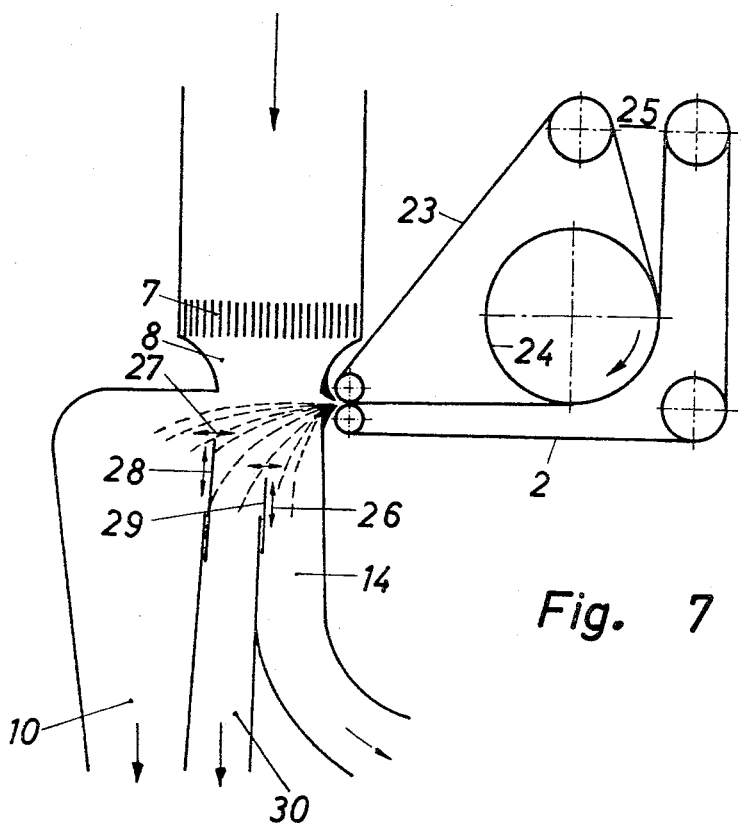
FIG. 7 shows schematically yet another transverse-flow sifter which divides the material into three fractions.

If two or more blades 28, 29 are arranged in the sifting zone and three or more withdrawal or removal ducts 10, 30, 14 behind them, the material under treatment is divided into three or more fractions, FIG. 7. In order to vary the cut sizes, the blades 28, 29 are arranged to be movable in a direction 26 of the gas stream lines.

An arrangement may also be devised in which the position of the blades 28, 29 is adjustable transversely to the direction of the current, viz. in a direction 27. The schematic FIG. 7 shows that the cut size is varied with each change in position of the blades.

The current carrying the fine material is preferably led into a duct which, for the purpose of pressure recovery, may be formed as a diffuser (as shown, for example, at 14).

The sifting current may be produced in various ways, and its pressure level may be adjusted. The operation may be by suction. In that case, as illustrated in FIG. 1, blowers 16 and 18 must follow the material recovery devices (e.g. cyclones 15 and 17). In open circuit, there is then subpressure in the sifting zone 14 and gas is drawn into the sifting zone at 11, 8 and 6. The quantities of gas fed at 11 and 6 must be accurately adjusted in order that the pressure at the mouth of the nozzle 8 and the velocity of emergence from the nozzle have the required magnitudes.

Operation may also be by pressure, for example by providing on the inlet side of the nozzle a blower which draws from the atmosphere. Further, closed-circuit operation is possible in which the gas current leaving the blower 16 is fed back into the flow duct above the flow straightener 7. Both in pressure operation and in closed-circuit operation it is possible, and indeed desirable, to select the pressure in the sifting zone 4 so as to be about the same as the external pressure. The blower 18 on the coarse-material side can then be omitted.

Figure 3:
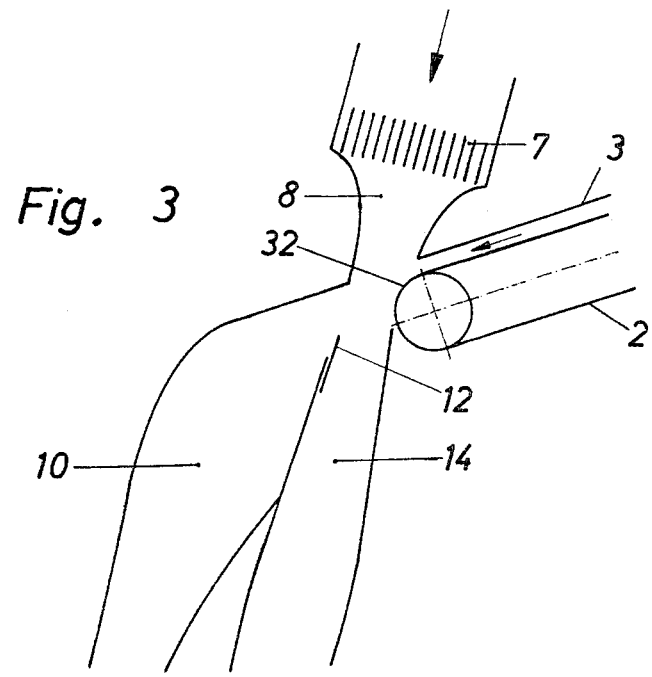
FIG. 3 shows schematically a still further modification of the transverse-flow sifter according to FIGS. 1 and 2.
Figure 4:
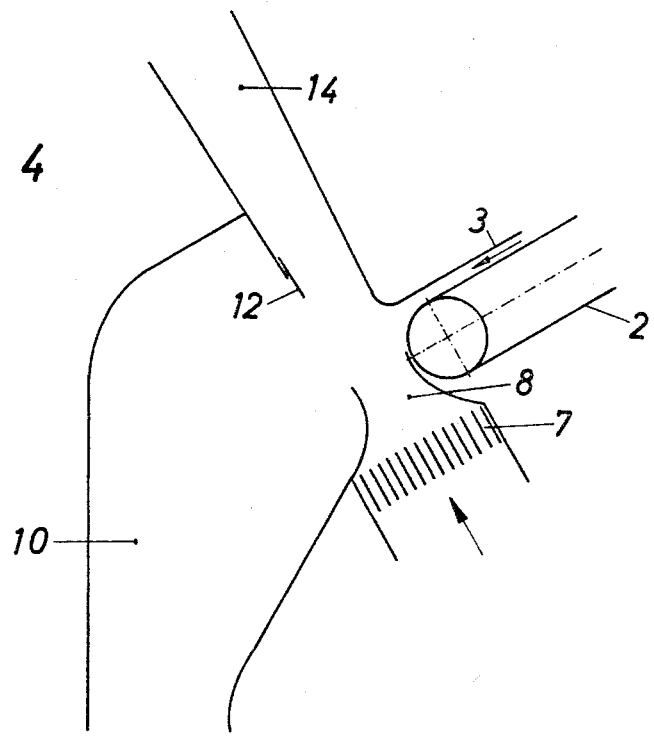
FIG. 4 illustrates another arrangement of the transverse flow sifter in which the gas stream is directed upwardly.

The direction of projection of the material may be horizontal, as shown in FIG. 1, at 5 and 6, or inclined, as in FIGS. 2, 3 and 4, or vertical, where two belts are used as in FIGS. 5, 6 and 7. The direction of the flow from the nozzle 8 may be upward, as in FIG. 4, or downward as in FIGS. 1–3 and 5–7, vertical as in FIGS. 1, 6 and 7 or inclined as in FIGS. 2–5. Which arrangement is most suitable is determined by the mode in which the subsequent conveyance of the material is effected.

It is also possible for the sifting current to be partly bounded by the conveyor belt 2 on the material entry side, as shown at 32, FIG. 3. In order to reduce the distance between the projection point and the entry point of the material, for example in fine sifting, an inclined gas current, guided as shown in FIG. 3, is advantageous. The inclined guiding of the flow, in which the direction of entry of the material forms an acute angle with the direction of the current, further has the advantage that the material already has a component of movement in the direction of the current.

Care must be taken, by selecting the entry velocity of the material, that the absolute velocity of the particles does not decrease along their path of movement, but preferably increases. With increasing absolute velocity of the particles of material their mutual spacing increases. This is an essential condition for satisfactory classification, and for treatment of material at a high feed rate.

An increase in the absolute velocity of the particles of material is already achieved if the velocity of the sifting current is higher than the velocity of entry of the material. This facilitates the condition that the entering material already has a component of movement in the direction of the sifting current.

The foregoing disclosure relates only to preferred embodiments and modifications of the invention, which is intended to include all changes and modifications of the examples described within the scope of the invention as set forth in the appended claims.

What we claim is:

1. A process for sifting granular material in a transverse current, comprising the steps of introducing all the particles of said material in a thin layer and at a predetermined forwarding velocity not less than about 5 m./s., receiving said particles in a gaseous transverse current having a velocity of at least 20 meters per second, so as to eliminate a dominating influence of gravity, while directing said current along planes coinciding with planes in which said material is introduced, the magnitude and direction of said current being set to be the same in parallel flow planes, separating at least one course fraction of said material from said current, collecting said fraction with the avoidance of rebound and reverse flow in such manner that no particles return into said current, and introducing an additional gaseous current directly over said thin layer parallel to said forwarding velocity and having a velocity adjustable between zero and the value of said forwarding velocity.

2. A process for classifying granular material according to size, comprising the steps on continuously transporting all of the particles of granular material in a thin layer, located at least in part in a given plane, at a predetermined forwarding velocity of at least five meters per second, so that said particles describe predetermined paths in said plane, throwing the thus-transported particles from said layer along trajectory paths forming extensions of said paths in said plane and located with said latter paths in planes perpendicular to said given plane, intersecting said trajectory paths with a gaseous current having an inner laminar core moving at a velocity of at least twenty meters per second and an outer zone of turbulence at a region of said core distant from said thin layer, while directing said current transversely with respect to said thin layer along said planes perpendicular to said given plane, so as to eliminate a dominant influence of gravity while entraining particles below a given size in said laminar core, and separating particles greater than said given size from said current while preventing rebounding and reverse flow of the latter particles back into said current.

3. A process according to claim 2, further comprising the steps of adjusting said forwarding velocity to between 5 and about 100 m./s., for controlling the cut size and the limit of said separating step, and adjusting said current velocity to between 20 and above 100 m./s.

4. A process according to claim 2, further comprising the step of leading the flow of said current so that the latter flows as a free jet on one opposite side of the point of entry of said material.

5. A process according to claim 4, said zone of turbulence taking up part of said free jet, further comprising the steps of supplying gaseous current to said free jet in the zone of turbulence, and separating at a given location said zone of turbulence from the remaining core, thereby withdrawing a coarse fraction of said material.

6. A process according to claim 5, further comprising the steps of displacing said location of said latter separating step in the direction of stream lines of said current.

7 A process according to claim 5, further comprising the step of displacing said location of said separate step transversely to the direction of stream lines of said current.

8. A process according to claim 5, further comprising the step of displacing said location of said separating step in the direction of and transversely to the direction of stream lines of said current.

9. A process according to claim 8, further comprising the step of introducing said material at an acute angle with respect to said direction of the stream lines.

10. A process according to claim 9, further comprising the step of introducing said current in a substantially downward direction.

11. A process according to claim 10, further comprising the step of obstructing the path of said core for recovering at least part of the pressure energy imparted to said current.

12. A device for shifting granular material in a transverse current, comprising, in combination, a projecting device for introducing all the particles of said material in a thin layer and at a predetermined forwarding velocity into a gaseous current, a flow duct for introducing said current, in the form of a laminar flow core, into a shifting zone where it entrains said particles, at least one coarse-material withdrawal duct which opens upwardly to said sifting zone below said flow duct and in front of said projecting device, said current having a zone of turbulence at the area of said core between said sifting zone and said coarse material withdrawal duct, at least one blade at the inlet edge of said coarse-material duct, said blade being adjustable parallel to the direction of stream lines of said current, and a secondary inlet for introducing additional gas into said zone of turbulence and into said coarse-material duct, said secondary inlet being situated laterally of said flow duct and approximately parallel thereto and having an outlet directed toward said coarse-material duct.

13. A device according to claim 12, wherein said blade is adjustable transversely of said direction of the current stream lines.

14. A decive according to claim 12, further comprising flow straightener means for said current and preceding said flow duct.

15. A device according to claim 12, wherein said blade is adjustable parallel to and transversely of said direction of stream lines of said current.

16. A device according to claim 15, wherein said flow duct terminates in a nozzle directing said current across said thin layer, and said projecting device being constituted by at least one conveyor means for feeding said material laterally into said current directly downstream of said nozzle.

17. A device according to claim 16, further comprising flow straightening means for said current preceding said nozzle.

18. A device according to claim 16, further comprising a wall substantially parallel with said one conveyor means and covering substantially its whole width in at least a central portion thereof to form an additional current inlet duct parallel to said thin layer of material to be introduced into said sifting zone.

19. A device according to claim 16, further comprising second conveyor means running at least partly in contiguous arrangement and substantially at the same speed as said one conveyor means, said one and said second conveyor means together forming said projecting device.

20. A device according to claim 19, wherein the walls of said coarse-material duct are flexible.

21. A device according to claim 20, wherein said walls of the coarse-material duct are formed at least partly by resilient curtain portions.

22. A device for sifting granular material in a transverse current, comprising, in combination, a projecting device for introducing all the particles of said material in a thin layer and at a predetermined forwarding velocity into a gaseous current, a flow duct for introducing said current into a sifting zone where it entrains said particles, at least one coarse-material withdrawal duct which opens upwardly to said sifting zone below said flow duct and in front of said projecting device, and at least one blade at the inlet edge of said coarse-material duct, said blade being adjustable parallel to the direction of stream lines of said current, said flow duct terminating in a nozzle directing said current across the thin layer, and said projecting device being constituted by at least one conveyor means for feeding said material laterally into said current directly downstream of said nozzle, and a wall substantially parallel with said one conveyor means and covering substantially its whole width in at least a central portion thereof to form an additional current inlet duct parallel to said thin layer of material to be introduced into said sifting zone.

References Cited by the Examiner

UNITED STATES PATENTS

| 1,374,645 | 4/1921 | Franklin | 209—145 X |
| 2,941,667 | 6/1960 | Hilgartner | 209—134 |
| 2,978,103 | 4/1961 | Cowher | 209—135 |
| 3,014,584 | 12/1961 | Kaufmann | 209—145 X |
| 3,164,548 | 1/1965 | Rowell | 209—139 |

FOREIGN PATENTS

| 839,031 | 5/1962 | Germany. |
| 1,138,351 | 10/1962 | Germany. |

FRANK W. LUTTER, *Primary Examiner.*